US009169089B2

(12) United States Patent
Rexius et al.

(10) Patent No.: US 9,169,089 B2
(45) Date of Patent: Oct. 27, 2015

(54) SYSTEM FOR CONVEYING DRILL CUTTINGS

(71) Applicant: Conveyor Application Systems LLC, Eugene, OR (US)

(72) Inventors: Arlen Rexius, Eugene, OR (US); David Looney, Monroe, OR (US); Matt Mills, Eugene, OR (US); Brent Whitley, Fall Creek, OR (US); Edward L. Landis, Scio, OR (US); Jason A. Holbert, Philomath, OR (US); John C. Holbert, Brinnon, WA (US)

(73) Assignee: Conveyor Application Systems LLC, Eugene, OR (US)

( * ) Notice: Subject to any disclaimer, the term of this patent is extended or adjusted under 35 U.S.C. 154(b) by 104 days.

(21) Appl. No.: 13/908,913

(22) Filed: Jun. 3, 2013

(65) Prior Publication Data

US 2013/0323005 A1    Dec. 5, 2013

Related U.S. Application Data

(60) Provisional application No. 61/654,897, filed on Jun. 3, 2012.

(51) Int. Cl.
*B65G 67/60* (2006.01)
*B65G 37/00* (2006.01)
(Continued)

(52) U.S. Cl.
CPC ............. *B65G 67/606* (2013.01); *B63B 25/02* (2013.01); *B63B 25/04* (2013.01); *B63B 27/20* (2013.01);
(Continued)

(58) Field of Classification Search
USPC ........... 141/104, 237, 242; 198/734; 222/199, 222/502, 503, 508, 556, 559, 565; 414/137.5, 137.8, 137.9, 138.2, 138.3, 414/138.5, 138.6, 138.7, 139.1, 139.3, 414/139.7, 140.2, 140.8, 140.9, 141.5, 414/142.1, 142.3, 142.4, 142.5, 142.9, 414/143.2, 803; 701/124; 73/65.04
See application file for complete search history.

(56) References Cited

U.S. PATENT DOCUMENTS 1,427,091 A * 8/1922 Case ........................ 414/139.3
2,865,566 A * 12/1958 Swenson ....................... 701/124
(Continued)

FOREIGN PATENT DOCUMENTS

JP    05-270482    10/1993
JP    2000-043784    2/2000
(Continued)

OTHER PUBLICATIONS http://bulkcarrierguide.com/self-unloaders.html, Operation of self-unloading bulk carriers—The conveyor system, gravity free-flow concept & SUL terminology, 7 pp., Aug. 15, 2010.
(Continued)

*Primary Examiner* — Gregory Adams
(74) *Attorney, Agent, or Firm* — Klarquist Sparkman, LLP

(57) ABSTRACT

The present disclosure concerns a system for transporting drill cuttings from an offshore drilling platform. In a representative embodiment, a bulk material storage and conveying system for a waterborne vessel comprises a first conveyor system including one or more upper conveyors extending lengthwise of the vessel. The system also comprises a plurality of containers located below the first conveyor system arranged in one or more rows, and a second conveyor system including one or more lower conveyors located below the one or more containers. The first conveyor system is configured to selectively dispense bulk material into the one or more containers, and the plurality of containers are configured to selectively dispense bulk material onto different locations along the length of the one or more lower conveyors. The system can further include an offloading conveyor assembly configured to convey drill cuttings from the lower conveyors to trucks on land.

10 Claims, 12 Drawing Sheets

(51) Int. Cl.
  *B63B 27/00* (2006.01)
  *B63B 25/02* (2006.01)
  *B63B 25/04* (2006.01)
  *B65G 63/00* (2006.01)
  *B65G 19/28* (2006.01)
  *B65G 47/51* (2006.01)

(52) U.S. Cl.
  CPC ............... *B65G 19/28* (2013.01); *B65G 37/00* (2013.01); *B65G 47/5195* (2013.01); *B65G 63/008* (2013.01)

(56) References Cited

U.S. PATENT DOCUMENTS

| | | | |
|---|---|---|---|
| 2,982,445 A * | 5/1961 | Koble | 222/55 |
| 3,329,808 A * | 7/1967 | Fisher | 701/124 |
| 3,334,608 A * | 8/1967 | Nemoto et al. | 114/74 R |
| 3,693,951 A | 9/1972 | Lawhon et al. | |
| 3,734,313 A * | 5/1973 | Gauthier et al. | 414/296 |
| 3,935,970 A * | 2/1976 | Spaw | 222/56 |
| 3,972,415 A | 8/1976 | Rohde | |
| 3,990,588 A | 11/1976 | Dibben | |
| 4,023,673 A | 5/1977 | Hansen | |
| 4,058,199 A | 11/1977 | Schlagel | |
| 4,067,468 A * | 1/1978 | Garsten et al. | 414/803 |
| 4,201,287 A | 5/1980 | Straub et al. | |
| 4,218,168 A * | 8/1980 | Parsons | 414/139.7 |
| 4,219,133 A * | 8/1980 | Sinsky | 222/39 |
| 4,222,498 A * | 9/1980 | Brock | 222/58 |
| 4,255,269 A | 3/1981 | Timmer | |
| 4,382,725 A * | 5/1983 | Dugge | 406/131 |
| 4,807,740 A * | 2/1989 | Teske | 198/525 |
| 4,878,576 A | 11/1989 | Dietzen | |
| 5,004,400 A * | 4/1991 | Handke | 414/808 |
| 5,868,284 A * | 2/1999 | Maechling et al. | 222/185.1 |
| 6,009,959 A | 1/2000 | Dietzen | |
| 6,109,425 A * | 8/2000 | Serenkin | 198/735.4 |
| 6,235,998 B1 | 5/2001 | Brewer | |
| 6,390,006 B1 * | 5/2002 | Sridhar | 114/73 |
| 6,505,727 B2 | 1/2003 | Schroeder et al. | |
| 6,607,659 B2 * | 8/2003 | Hensley et al. | 210/87 |
| 6,609,543 B2 * | 8/2003 | Sridhar | 141/242 |
| 6,691,853 B1 | 2/2004 | Basketfield | |
| 6,945,382 B2 | 9/2005 | Harstad et al. | |
| 6,988,567 B2 | 1/2006 | Burnett et al. | |
| 7,484,574 B2 | 2/2009 | Burnett et al. | |
| 7,514,011 B2 | 4/2009 | Kulbeth | |
| 7,662,296 B2 | 2/2010 | Pancaldi et al. | |
| 7,818,947 B2 | 10/2010 | Kim | |
| 7,845,516 B2 * | 12/2010 | Pessin et al. | 222/58 |
| 2008/0179090 A1 * | 7/2008 | Eia et al. | 175/5 |
| 2009/0227477 A1 | 9/2009 | Burnett | |
| 2011/0036633 A1 | 2/2011 | Reddoch | |

FOREIGN PATENT DOCUMENTS

| | | |
|---|---|---|
| JP | 2003-54487 | 2/2003 |
| WO | WO 03-006308 | 1/2003 |

OTHER PUBLICATIONS http://www.americansteamship.com/self-unloading-technology.php, Self Unloading Technology, American Steamship Company, 2 pp., Nov. 20, 2008.
http://www.tc.gc.ca/eng/marinesafety/tp-tp127-hazardous-2221.htm, Hazardous Locations, Transport Publication TP 127 E, Transport Canada, 11 pp., Nov. 11, 2010.
International Search Report and Written Opinion issued Sep. 13, 2013 for corresponding International application No. PCT/US2013/043890, filed Jun. 3, 2013, 9 pp.

* cited by examiner

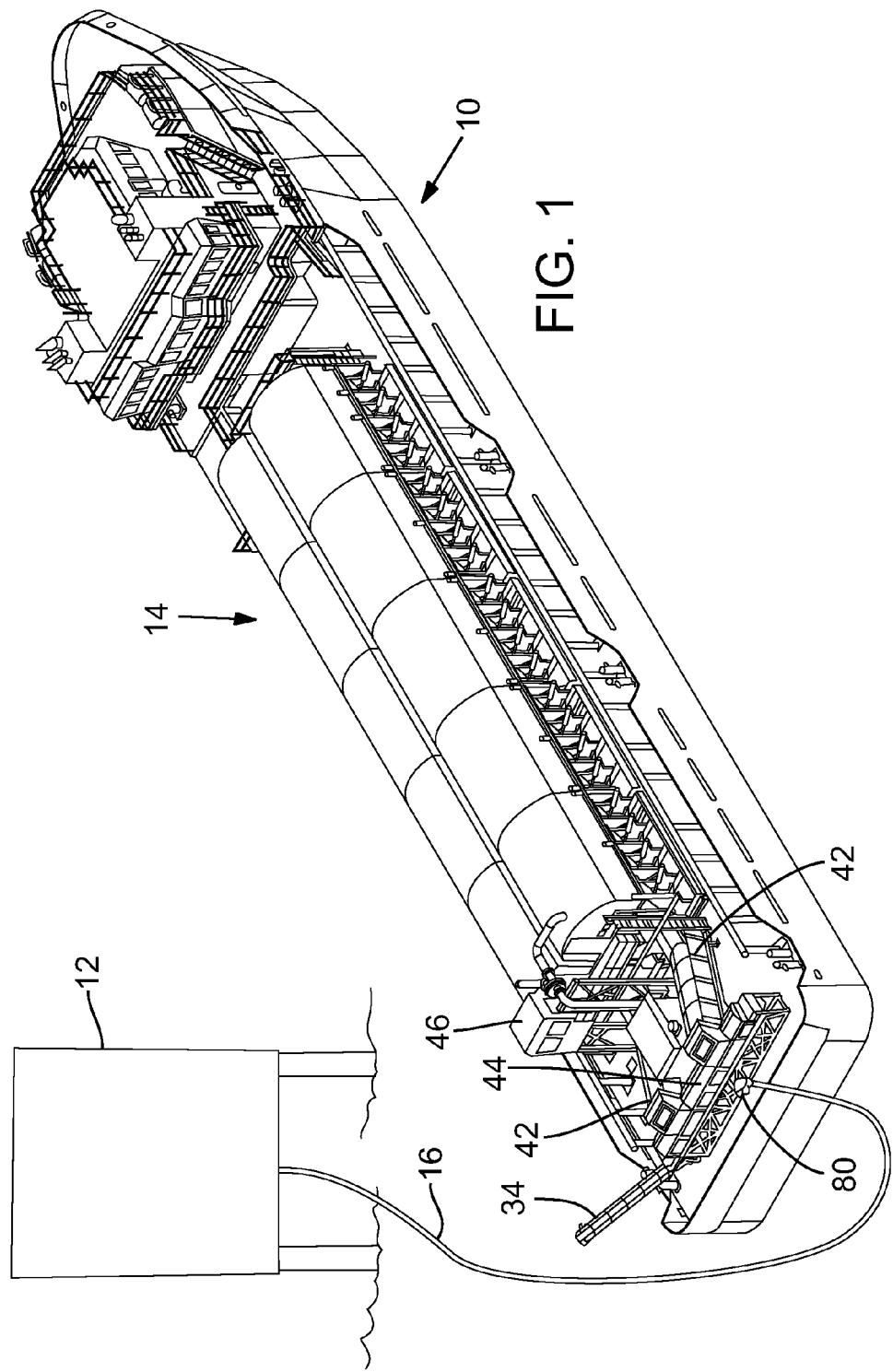

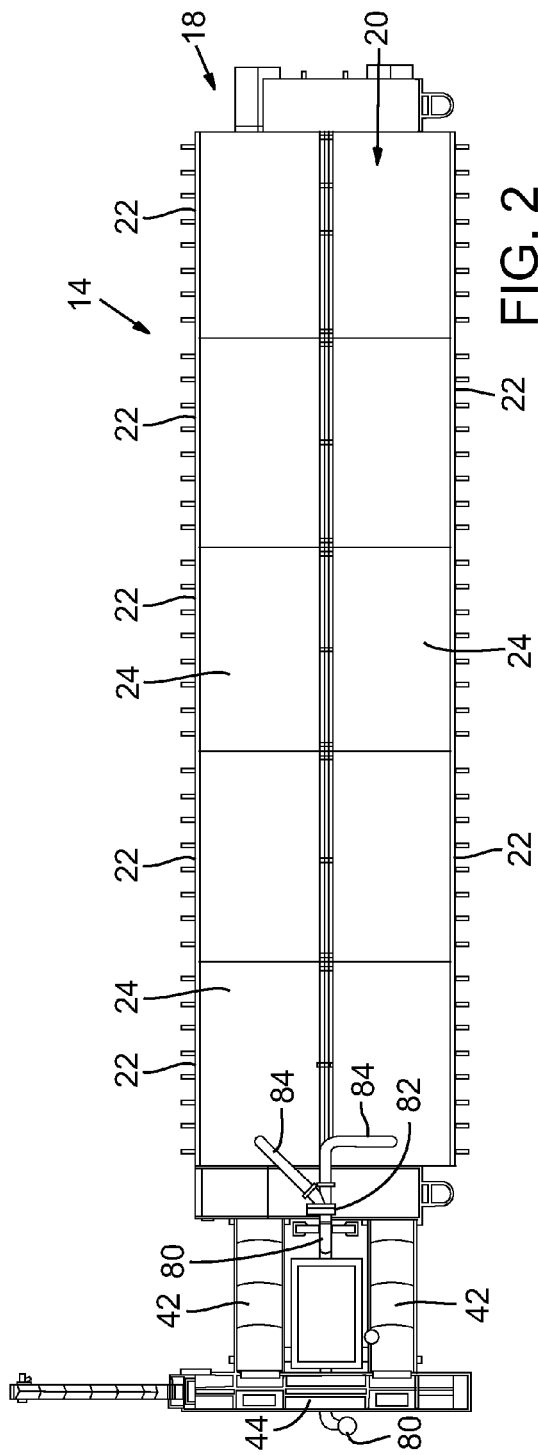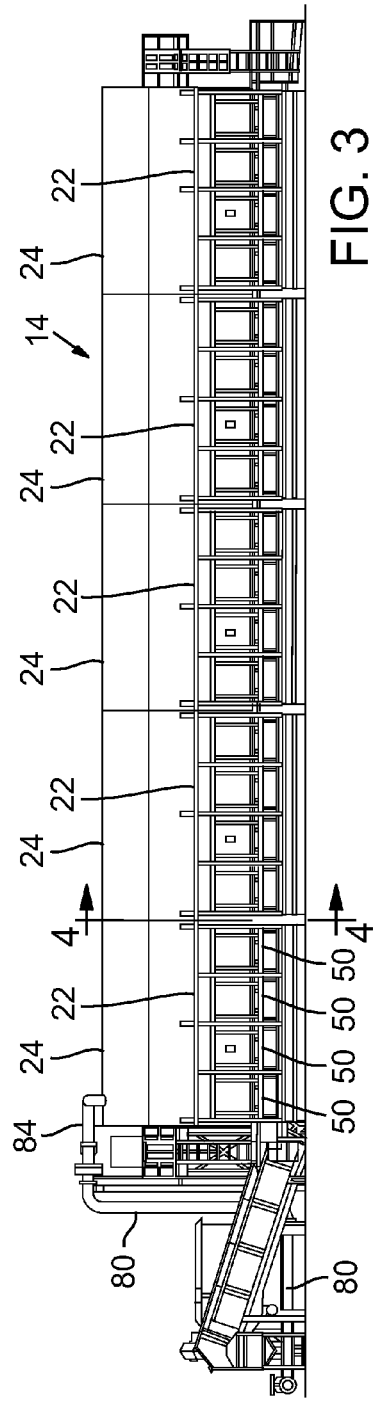

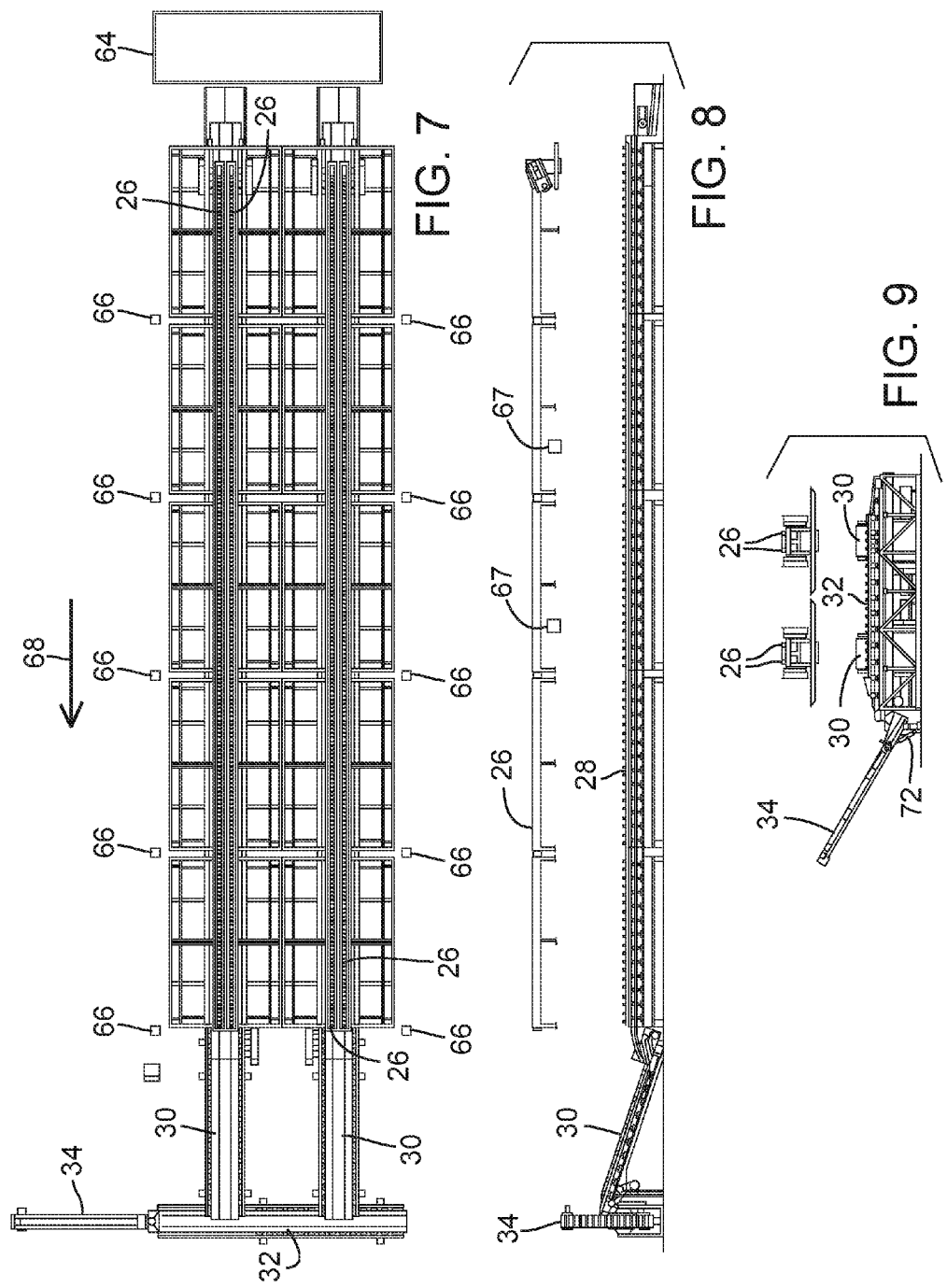

SYSTEM FOR CONVEYING DRILL CUTTINGS

CROSS REFERENCE TO RELATED APPLICATION

This application claims the benefit of U.S. Provisional Patent Application No. 61/654,897, filed Jun. 3, 2012. The provisional application is incorporated herein by reference in its entirety.

FIELD

The present disclosure concerns a system for transporting drill cuttings from an offshore drilling platform.

BACKGROUND

During offshore drilling of wellbores, drill cuttings are circulated to the surface by drilling fluid returning from the bottom of the wellbore. At the surface, various separation and collection equipment is used to separate most of the drilling fluid from the drill cuttings. The drilling fluid is re-used while the drill cuttings are collected for subsequent treatment and disposal. The drill cuttings typically are loaded into storage bins and then transported to shore on a ship. Known loading techniques involve transporting drill cuttings from a drilling rig to storage bins on a ship via a flexible pipe. After each storage bin is filled with drill cuttings, the feed pipe is manually disconnected from the current bin or intake manifold for the current bin and moved to another bin or intake manifold. Typically, the storage bins containing the drill cuttings are offloaded from the ship to the shore using a crane, which is time consuming and requires multiple operators to complete the job. Depending on the size of the ship, the offloading procedure can take about seven days or more to complete. The present disclosure concerns a system for more efficiently transporting the collected drill cuttings from an offshore drilling rig to shore.

SUMMARY

Several embodiments of devices and methods are shown and described herein directed to transporting drill cuttings from an offshore drilling platform. In one representative embodiment, an apparatus for a bulk material storage and conveying system for a ship comprises a first conveyor system including one or more upper conveyors extending lengthwise of the ship. The system also comprises a plurality of containers located below the first conveyor system arranged in one or more rows extending lengthwise of the ship, and a second conveyor system including one or more lower conveyors located below the one or more containers. The first conveyor system is configured to selectively dispense bulk material into the one or more containers, and the plurality of containers are configured to selectively dispense bulk material onto different locations along the length of the one or more lower conveyors.

Another representative embodiment comprises a method of loading drill cuttings onto a ship. The method comprises providing a system for conveying drill cuttings including a conveyor system and a plurality of containers located below the conveyor system, wherein the conveyor system and the plurality of containers extend lengthwise of the ship. The system receives drill cuttings from a drilling rig onto the conveyor system, conveys the drill cuttings along the conveyor system, and dispenses the drill cuttings from the conveyor system into the plurality of containers such that the balance of the ship is maintained during loading.

Another representative embodiment comprises a method of loading drill cuttings onto a ship. The method comprises providing a system for conveying drill cuttings including a conveyor system and a plurality of containers located below the conveyor system, wherein the conveyor system and the plurality of containers extend lengthwise of the ship. The system receives drill cuttings from a drilling rig onto the conveyor system, conveys the drill cuttings along the conveyor system, and dispenses the drill cuttings from the conveyor system into the plurality of containers such that the balance of the ship is maintained during loading. The drill cuttings include multiple types of material from different strata of a wellbore. The drill cuttings can be dispensed such that each container includes multiple layers of different types of material. The drill cuttings can also be dispensed such that pairs of two containers that are equidistant from but on opposite sides of the ship's center of gravity include substantially the same amount of material in each layer of different material that is dispensed into the two containers.

The foregoing and other features and advantages of the invention will become more apparent from the following detailed description, which proceeds with reference to the accompanying figures.

BRIEF DESCRIPTION OF THE DRAWINGS

FIG. 1 is a perspective view of a ship having an onboard drill cutting storage and conveying system anchored adjacent an offshore drilling rig.

FIG. 2 is a top plan view of the drill cutting storage and conveying system of FIG. 1.

FIG. 3 is a side elevation view of the drill cutting storage and conveying system of FIG. 1.

FIG. 7 is a top plan view of the drill cutting storage and conveying system of FIG. 1, shown with the storage bins and enclosures removed for purposes of illustration.

FIG. 8 is a side elevation view of the drill cutting storage and conveying system of FIG. 1, shown with the storage bins and enclosures removed for purposes of illustration.

FIG. 9 is an end elevation view of the drill cutting storage and conveying system of FIG. 1, shown with the storage bins and enclosures removed for purposes of illustration.

DETAILED DESCRIPTION

FIG. 1 shows a ship 10 anchored adjacent an offshore drilling rig, or platform, 12. Equipment on the deck of the drilling rig 12 separates drill cuttings from drilling fluid and stores the cuttings, which are then transported to shore via the ship. Mounted on the ship 10 is a drill cutting storage and conveying system 14, which receives drill cuttings from the drilling rig 12 and then offloads the drill cuttings to land-based equipment for further processing and disposal. Drill cuttings can include clay, mud, soil, rock (e.g., shale, etc.), sand, or other materials representative of the different strata of a wellbore. In some embodiments, drill cuttings can be collected and stored on the drilling rig 12, where the cuttings may undergo varying degrees of processing (e.g., separation of drilling fluid from the cuttings, drying, etc.) before being transferred to the ship 10. Alternatively, drill cuttings need not be collected or stored on the drilling rig 12, but can be transferred from the drilling rig 12 to the ship 10 with minimal or no processing. While the following description proceeds with reference to loading and unloading a ship, it should be understood that the system 14 can be installed on any type of waterborne vessel, including a ship or a barge.

The storage and conveying system 14 in the illustrated embodiment receives drill cuttings from the drilling rig 12 via a conduit 16 (e.g., a flexible pipe). The drilling rig 12 can include equipment that is operable to fluidize the drill cuttings using compressed air and establish a flow of fluidized drill cuttings through the conduit 16 and into the storage and conveying system 14. However, other techniques or mechanisms can be used to transport the drill cuttings from the drilling rig 12 to the onboard storage system 14. For example, a system of one or more conveyors can be used to convey the drill cuttings from the drilling rig to the onboard storage system 14.

Figure 4:
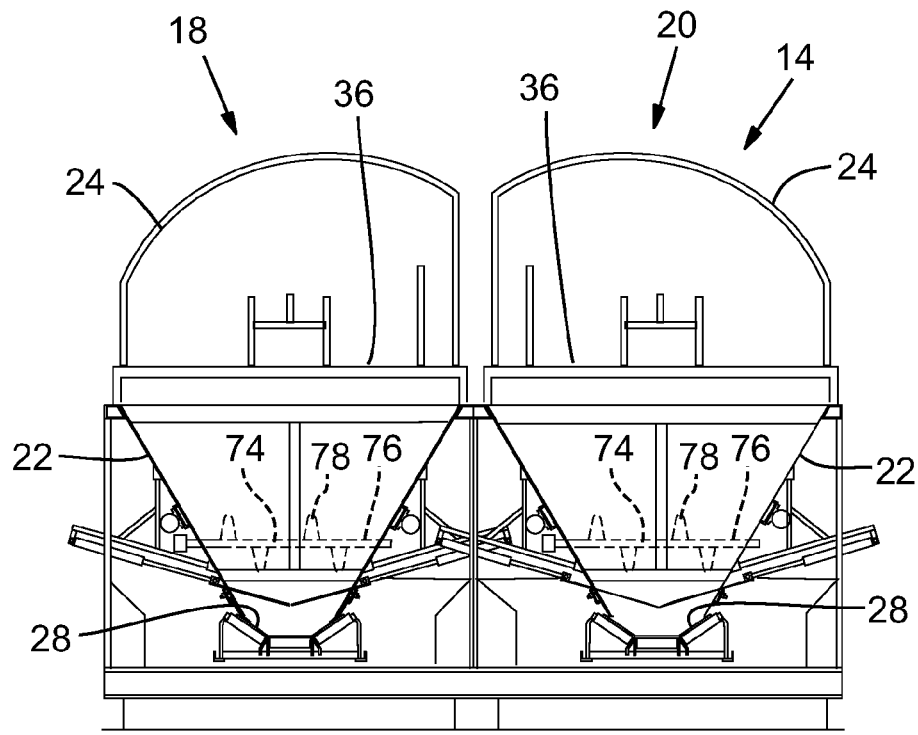
FIG. 4 is a cross-sectional view of the drill cutting storage and conveying system of FIG. 1.

Referring to FIGS. 2-4, the onboard storage system 14 comprises first and second rows 18, 20, respectively, of storage bins 22 (also referred to as storage hoppers and containers) placed end-to-end in their respective rows extending lengthwise of the ship. The storage system 14 in the illustrated embodiment includes five storage bins 22 in each row. However, the number of storage bins can vary depending on the volume of drill cuttings to be transported and the overall size of the ship. In addition, the storage system in other embodiments can include one row of storage bins or more than two rows of bins, depending on size and space available on the ship and the volume of drill cuttings to be transported. The bins 22 desirably have a modular construction, meaning that each bin has the same overall size and shape to facilitate assembly and removal and replacement of storage bins when maintenance is required. An enclosure, or cover, 24 may be mounted above each bin 22 to keep the elements out of the bins.

FIGS. 6-9 show the onboard storage system 14 without the storage bins 22 and the covers 24 for purposes of illustration. As shown, the onboard storage system 14 further includes one or more loading conveyors 26 extending above each row 18, 20 of bins 22 in a direction parallel to the length of the ship. In the illustrated embodiment, two loading conveyors 26 extend above each row of bins, although a fewer or greater number of conveyors can be positioned above each row of bins depending on the loading requirements. The loading conveyors 26 are operable to convey and dispense cuttings received from the drilling rig 12 into the bins 22, as further described in detail below.

The storage system 14 also includes an offloading conveyor system for transporting drill cuttings in the storage bins 22 to equipment waiting at the shore. The offloading conveyor system includes at least one offloading conveyor 28 extending below each row 18, 20 of bins 22 in a direction parallel to the length of the ship. The offloading conveyor system further includes respective inclined conveyors 30 positioned at the ends of the offloading conveyors 28, a transverse conveyor 32 extending in a traverse direction with respect to the inclined conveyors, and a final offloading conveyor 34 that conveys drill cuttings into vehicles or other equipment waiting at the shore. The operation of the offloading conveyor system is further described in greater detail below.

Referring again to FIG. 1, each inclined conveyor 30 can be provided with a respective enclosure 42 to keep out the elements. Similarly, the transverse conveyor 32 can be provided with a respective enclosure 44. An operator cab 46 can be located near the final offloading conveyor 34. As will be described in greater detail below, the entire process of loading drill cuttings onto the ship and offloading drill cuttings from the ship onto vehicles waiting at the shore can be accomplished with a single operator. The operator can control various components of the storage system 14 via a controller 40 (depicted schematically in FIG. 6) which can be located at a convenient location, such as in the operator cab. The controller 40 can be a general purpose computing device, such as a desk top or lap top computer, a tablet computer, or smart phone. The controller 40 is in communication with various components of the storage system 14, including the loading and offloading conveyors, via wireless or hard-wired communication links.

As best shown in FIG. 4, each enclosure 24 above a respective bin 22 houses a portion of a walkway or operator platform 36 above the bin 22. The enclosures 24 are placed end-to-end to form an elongated enclosed structure, much like a tunnel, extending above each row of storage bins 22. Each platform 36 desirably extends through the enclosed structure along the entire length of the row of storage bins 22 to allow an operator to access and inspect the area above storage bins.

As noted above, drill cuttings from the drilling rig 12 can be transferred to the ship via a flexible conduit 16 extending from the drilling rig 12. The end of the conduit 16 can be connected to an inlet conduit 80 on the ship (best shown in FIGS. 1 and 2). The inlet conduit 80 in turn is connected to a metering device 82, which in turn is connected to two outlet conduits 84, each of which is configured to dispense drill cuttings onto a pair of loading conveyors 26 on one side of the storage system 14. As shown in FIG. 2, each outlet conduit 84 can extend downwardly through an adjacent enclosure 24 toward the inlet ends of the loading conveyors 26. The metering device 82 desirably is configured to meter substantially equal amounts of drill cuttings to each row 18, 20 of storage bins through respective outlet conduits 84, and can meter drill cuttings to the rows 18, 20 of storage bins individually or at the same time.

When the metering device 82 dispenses drill cuttings to one row of storage bins, the loading conveyors 26 corresponding to the row of storage bins not receiving drill cuttings can be idled or otherwise rendered in a non-operational state. For example, when the metering device 82 is dispensing drill cuttings to the first row 18 of storage bins 22, the loading conveyors 26 corresponding to the first row 18 can be in an operational state and the loading conveyors 26 corresponding to the second row 20 of storage bins 22 can be idled. Similarly, when the metering device 82 changes from dispensing drill cuttings to the first row 18 of storage bins 22 to dispensing drill cuttings to the second row 20 (e.g., to maintain the balance of the ship during loading), the loading conveyors 26 corresponding to the second row 20 of storage bins 22 can be in an operational state and the loading conveyors 26 corresponding to the first row 18 can be idled. Operating the loading conveyors in this manner can avoid unnecessary waste of fuel and wear and tear on the machinery.

Figure 16:
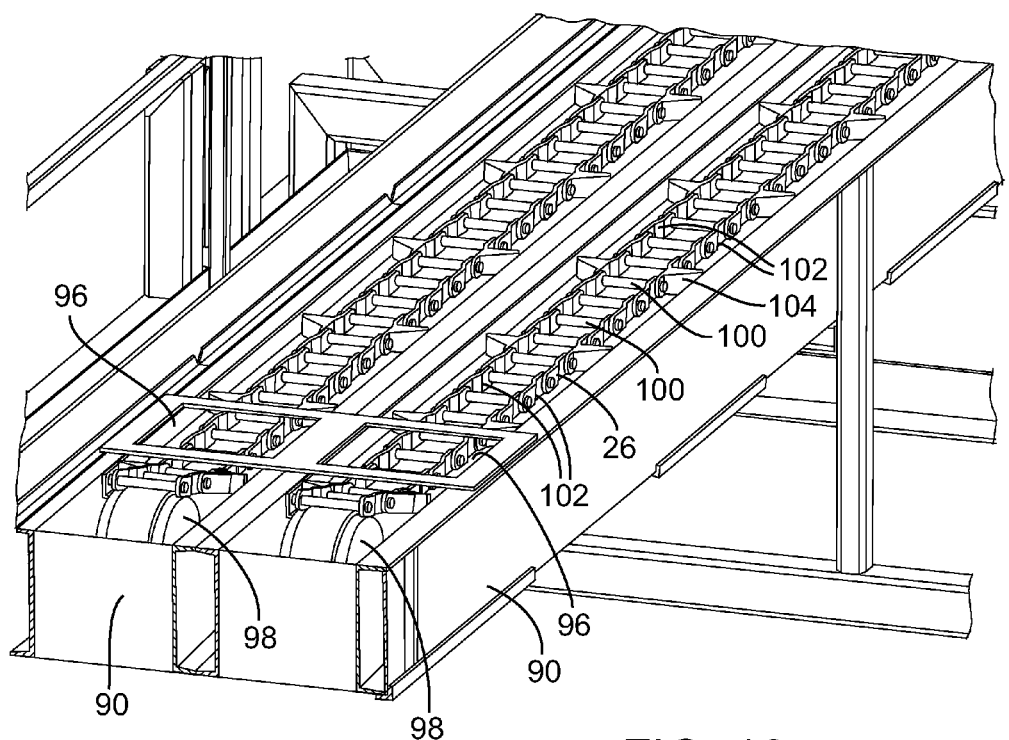
FIG. 16 is another perspective view of a section of the pair of drag chain conveyors.
Figure 17:
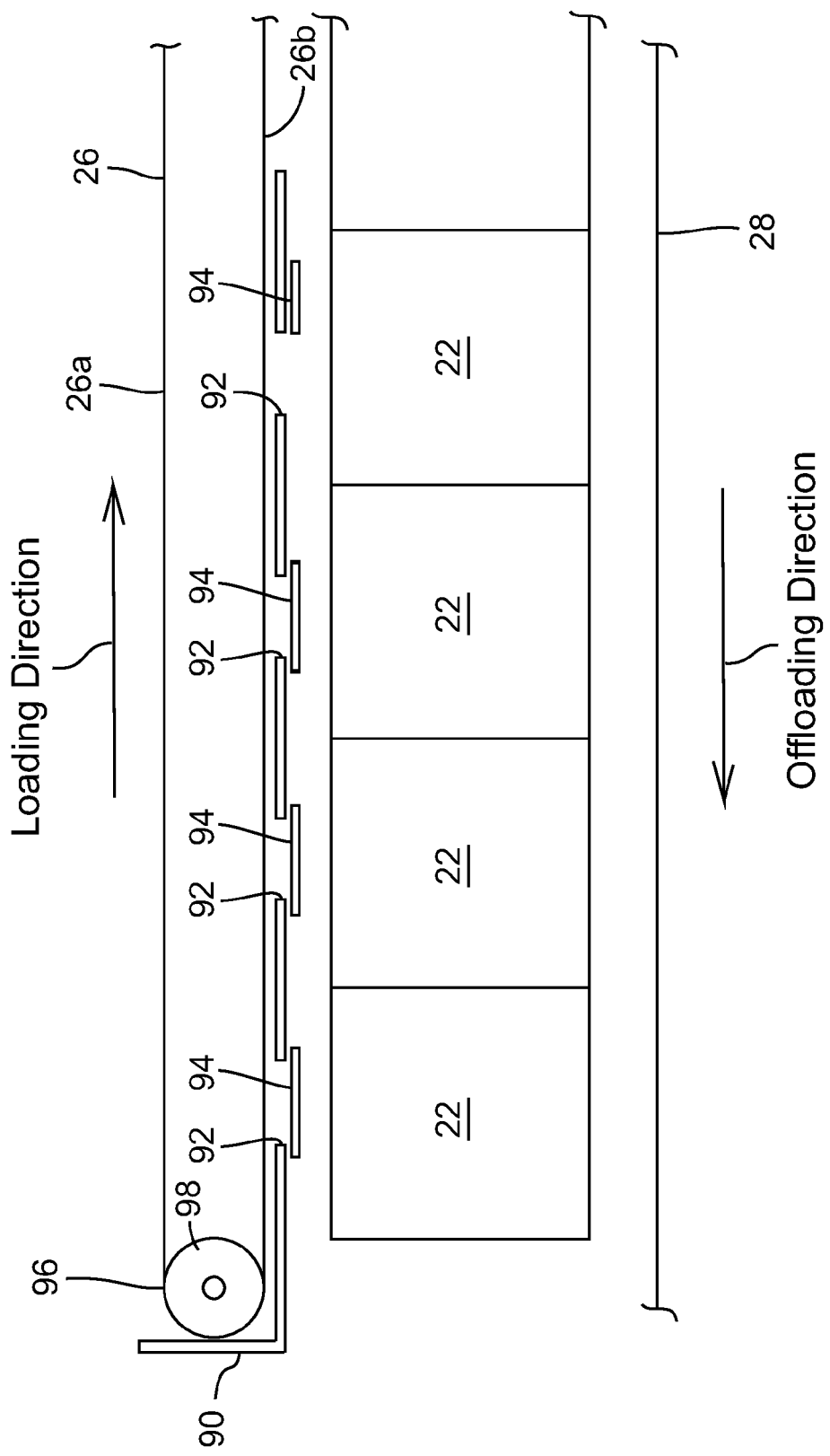
FIG. 17 is a schematic, side elevation view showing the operation of a drag chain conveyor being used to dispense drill cuttings into storage bins.

Referring to FIGS. 14-17, each outlet conduit 84 can feed two dispensing conduits 88 (FIG. 14), the lower ends of which can be positioned above inlet ends 96 of corresponding loading conveyors 26. As best shown in FIG. 16, each loading conveyor 26 can be positioned within a respective U-shaped trough 90 that extends above a row of storage bins 22. Each loading conveyor 26 extends around a pulley or sprocket 98 at its opposite ends, forming a continuous loop defining an upper section 26a and a parallel lower section 26b (FIG. 17). The loading conveyor 26 can be a drag chain conveyor comprising spaced apart, parallel lugs 100 connected to each other by articulating links 102. The conveyor can further include teeth 104 extending outwardly from selected links 102 (e.g., on every fourth link 102) on opposite sides of the conveyor.

When drill cuttings are loading onto the ship, the dispensing conduits 88 dispense drill cuttings above the inlet ends of the troughs. The drill cuttings can fall through the spaces in the drag chain conveyor onto the bottom wall of the trough. The drill cuttings are then dragged along the bottom wall of the trough by the lower section 26b of the drag chain. As best shown in FIG. 17, the bottom wall of the trough 90 has openings 92 spaced along the length of the trough that allow drill cuttings to fall through the trough into the bins 22 below as the drill cuttings are dragged across the bottom wall of the trough. Adjacent each opening 92 is a respective gate 94 (also referred to as a trap door), which can be under the control of the controller 40. Each gate 94 is configured to move between a closed position covering its respective opening 92 to prevent drill cuttings from falling through the opening and an open position to allow drill cuttings to fall through the opening into the bin below. The gates 94 can be moved between their open and closed positions by respective hydraulic cylinders or equivalent mechanisms operatively connected to each of the gates.

The pair of conveyors 26 above a row of bins can be operated in unison to convey drill cuttings into selected bins of the row. The use of at least two conveyors 26 above each row of bins adds redundancy to the system in case one conveyor malfunctions and requires repair, for example if a chain breaks. Thus, if one of the conveyors 26 malfunctions and causes a built up of drill cuttings in the corresponding dispensing conduit 88, all of the drill cuttings coming from the common outlet conduit 84 fall under gravity into the other dispensing conduit 88 and onto the other conveyor 26, which is able to continue the conveying and dispensing process without shutting down the system.

The gates 94 can be operated in a predetermined sequence to ensure that the balance of the ship is maintained during the loading process. Each of the storage bins 22 can have one or more sensors, such as optical sensors and/or scales, that can detect the amount of drill cuttings that has been loaded into each of the bins. In particular embodiments, a 3D sensor can be mounted in or above each bin so as to be able to sense the height and topography of the drill cuttings in each bin. The 3D sensors can be used to generate images of the drill cuttings in each bin, which can be displayed on a monitor (e.g., a monitor of the controller 40 or another device). 3D sensors are known in the art and utilize a radiation source (such as infrared radiation source) to sense the topography of an object.

The sensors and/or scales are in communication with the controller 40 to ensure that each bin is filled at substantially the same rate. For example, the loading process can comprise loading a predetermined first bin 22 (which can be any of the bins) to a predetermined height, or until the weight of cuttings in the first bin 22 reaches a predetermined weight. At this point, the controller 40 opens the gate 94 of a second bin 22 that is the same distance from the ship's center of gravity CG (FIG. 18) as the first bin but on the opposite side of the ship's center of gravity from the first bin. The second bin 22 can be on the same side or opposite side of the ship's center line L (FIG. 18) from the first bin. The gate 94 of the second bin remains open until it is filled to the same height as the first bin. The controller 40 repeats this process with additional pairs of bins that are equidistant from the ship's center of gravity until each bin has approximately the same amount of drill cuttings. The foregoing process of partially filling opposing pairs of bins is then repeated until each bin is filled to capacity or there are no more drill cuttings being transferred from the drilling rig 12. If at any time during the loading process one of the gates 94 over a particular bin fails to close, that bin can be filled and the drill cuttings on the conveyor are simply conveyed over the material in the filled bin and dispensed into a selected downstream bin. If one of the gates 94 fails and cannot be opened, the controller determines the amount of drill cuttings that has been dispensed into that bin, if any, and only allows the same amount of drill cuttings to be loaded into a bin that is on the opposite side of ship's center of gravity and longitudinal center line L.

The overall weight or predetermined height of drill cuttings dispensed into a bin during each pass typically depends on the size of the ship. For a relatively large ship, a relatively large amount of drill cuttings can be dispensed into each bin during each pass. For a relatively smaller ship, a relatively smaller amount of drill cuttings can be dispensed into each bin during each pass to ensure the balance of ship is maintained.

Where less precision is required, such as because a relatively large ship is being loaded, the bins can be loaded by opening and closing the gates 94 for a predetermined period of time. This allows dispensing of approximately equal amounts of drill cuttings into the bins without the use of a feedback loop involving the sensors measuring the height and/or weight of drill cuttings in the bins.

The system 14 can also be configured to dispense drill cuttings comprising different materials into different bins 22. For example, when drill cuttings being transferred from the drilling rig 12 comprise a particular material, such as clay, the controller 40 can operate the gates 94 of the conveyors 26 such that each bin 22 contains substantially equal amounts of clay. When the type of material changes, for example, from clay to rock, the controller 40 can operate the gates 94 of the conveyors 26 such that each bin 22 contains substantially equal amounts of rock in addition to the clay. In this manner, each bin 22 (or pairs of bins on opposite sides of and equidistant from the ship's center of gravity) can include multiple layers of drill cuttings of different material from the different strata of a wellbore. The drill cuttings can be offloaded from the bins in the same sequence that they were filled, thereby allowing separation of the different types of material so that each vehicle or container on shore can be filled with substantially one type of material.

Alternatively, the system 14 can be configured to dispense particular types of material into particular bins. For example, a select bin or bins 22 (e.g., selected pairs of bins on opposite sides of and equidistant from the ship's center of gravity) can be partially or completely filled with a single material (e.g., when select bins have equipment for handling particular materials, such as agitators for handling clay or mud). In some embodiments, the drill cuttings material type and the approximate quantity of each material can be identified on the drilling rig 12 and communicated to the controller 40 before transfer of the drill cuttings to the ship 10. Alternatively, the controller 40 can differentiate and dispense different materials into different bins 22 by, for example, weight, as measured by scales 67 positioned under the conveyors 26 (see FIG. 8). Additionally, the controller 40 can be configured to record the sequence in which bins 22 are filled with drill cuttings, along with the type of material and/or the amount (e.g., weight, volume, etc.) of drill cuttings dispensed. In this manner, the bins 22 can be emptied in substantially the same order in which they were filled, helping to maintain the balance of the ship during offloading.

In some cases, different types of drilling fluid, such as water-based drilling fluid and oil-based drilling fluid, may be used on the same wellbore. For instance, a water-based drilling fluid may be used for drilling through mud and clay, and oil-based drilling fluid may be used for drilling through rock and shale. In such cases, it is possible to separate the drill cuttings into the bins based on the cutting fluid used for that strata of the wellbore. For example, all drill cuttings mixed with a water-based drilling fluid (e.g., mud and clay) can be selectively dispensed into selected pairs of bins on opposite sides of and equidistant from the ship's center of gravity, while all drill cuttings mixed with an oil-based drilling fluid (e.g., rock or shale) can be dispensed into other selected bins to prevent mixing of the two different types of cutting fluid. Where drill cutting materials are separated into the storage bins based on the type of drilling fluid, offloading the bins in the same sequence that they were filled allows the drill cuttings to be offloaded and separated into separate trucks or bins on the shore based on the type of material and the type of drilling fluid. For example, each truck can be loaded with only one type of drill cutting material or filled with different types of drill cutting material mixed with the same drilling fluid. As can be appreciated, this greatly facilitates the disposal and/or recycling process of the drill cutting materials.

The system 14 can include one or more tilt sensors configured to sense the pitch and/or roll of the ship. The tilt sensors can comprise, for example, mercury switches, inclinometers, accelerometers, etc., and can be in communication with the controller 40. In this manner, the controller 40 can alter the sequence in which the bins 22 are being loaded in real time in response to data about the pitch and/or roll of the ship to maintain the balance of the ship during loading and offloading.

A significant advantage of the disclosed system is that it needs only a single intake pipe to receive drill cuttings from the conduit 16. During the entire loading procedure, the conduit 16 remains connected to the inlet conduit 80, which in turn can dispense drill cuttings to all of the bins on the ship. Unlike prior art systems, the conduit 16 need not be manually disconnected and re-connected to another manifold after each bin or set of bins is filled, resulting in significant time savings and much less operator involvement. Moreover, accurate and precise control over the amount of drill cuttings can be achieved with little or no operator involvement. Further, in certain embodiments, a person on the drilling rig 12 can have a separate controller, which can be in the form of a personal computer, such as tablet or laptop computer or smart phone, which can be in communication with the controller 40 and/or the various sensors of the system 14. In that way, a person on the rig can monitor the amount of drill cuttings in the bins and can adjust the rate at which drill cuttings are transported to the ship via the conduit 16.

Figure 10:
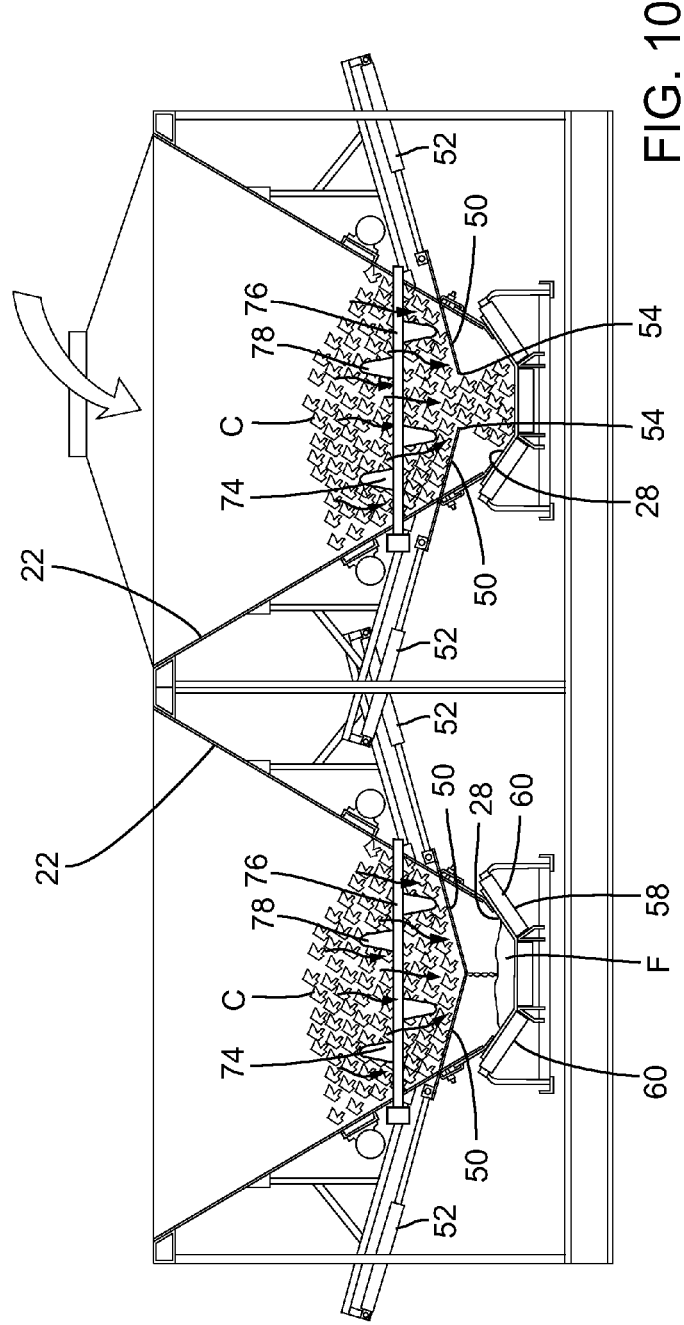
FIG. 10 is an enlarged cross-sectional view of a pair of storage bins of the drill cutting storage and conveying system.

Referring now to FIG. 10, each storage bin 22 in the illustrated embodiment can include at least one pair of opposing gates 50 that cover an outlet opening at the bottom of the bin. Each gate 50 is movable between a closed position to retain drill cuttings C within the bin (as shown on the left in FIG. 10) and an open position to allow drill cuttings C to fall through the outlet of the bin onto the offloading conveyor 28 (as shown on the right in FIG. 10). Each gate 50 can be operatively coupled to a hydraulic cylinder 52 that is configured to move the gate between the open and closed positions, or between the closed position and a partially open position that is intermediate the fully closed and open positions. In alternative embodiments, other mechanisms can be used to effect movement of the gate, such as electric motors, pneumatic cylinders and equivalent mechanisms.

As best shown in FIG. 3, each storage bin 22 can be provided with a total of four pairs of gates 50 positioned end-to-end underneath the outlet of the bin 22, although a fewer or greater number of pairs of gates can be used. Utilizing multiple pairs of gates 50 under each bin allows the contents of each bin to be emptied onto the offloading conveyor 28 in a controlled manner, as further described below. In other embodiments, a single pair of gates 50 can cover the entire extent of the outlet opening of a bin, or a single gate can be used to cover the entire extent of the outlet opening of a bin.

Figure 11:
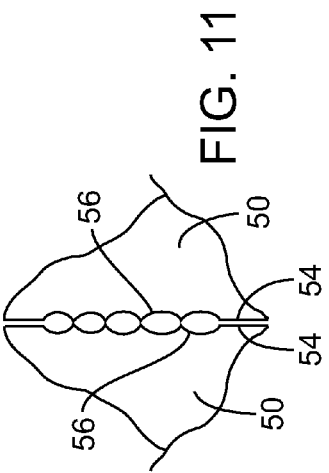
FIG. 11 is an enlarged top plan view of a section of a pair of gates covering the outlet opening of a storage bin.

Referring again to FIG. 10, the gates 50 desirably are tilted downwardly moving in a direction from the sides of the bin toward the center of the bin where the inner edges 54 of the gates can contact each other or come into close proximity to each other when the gates are closed. In this manner, the gates 50 direct residual drilling fluid F in the bin to flow downwardly toward the adjacent edges 54 of the gates. As shown in FIG. 11, the edges 54 can be formed with scallops or recesses 56 that are large enough to allow residual drilling fluid F to fall through the gates and onto the conveyor 28 below, but small enough to retain the drill cuttings in the bin. In this manner, the scalloped edges 56 function as a filter or sieve that separates the residual drilling fluid from the drill cuttings. In lieu of or in addition to the scalloped edges 56, the gates 50 can be formed with apertures, or openings, that are sized to retain the drill cuttings in the bin and allow drilling fluid to flow through the gates.

One or more of the bins 22 can also include agitators 74, as shown in FIGS. 4 and 10. The agitators 74 can be located near the bottom of the bins 22 above the outlet opening, and can comprise a rotatable shaft 76 having one or more protrusions or paddles 78. When the shaft 76 is rotated, the paddles 78 can agitate the drill cuttings C, which can facilitate dispensing of the drill cuttings from the bins 22 onto the offloading conveyor 28 when the gates 50 are opened. In some embodiments, each bin 22 can include an agitator 74. Alternatively, agitators 74 can be included with select bins configured for handling specific materials, such as materials prone to clogging the outlet opening during offloading (e.g., clay, mud, etc.). Additionally, each respective agitator 74 can be configured to turn on when the gates 50 of the respective bin 22 are opened, and to turn off when the gates 50 of the respective bin 22 are closed, regardless of the operational state of agitators in adjacent bins.

Figure 12:
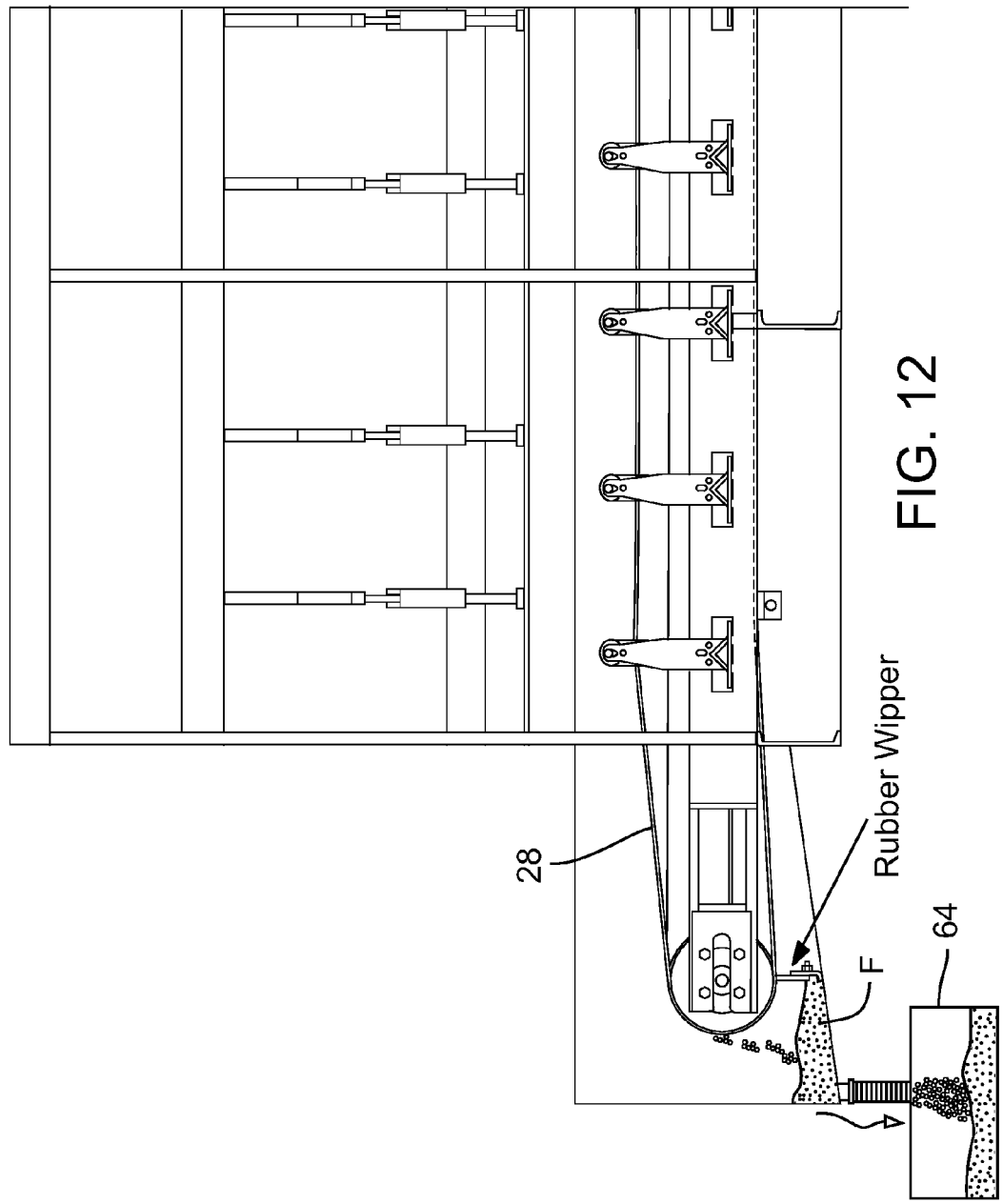
FIG. 12 is a side elevation view of one end of the offloading conveyor.

The offloading conveyor 28 desirably has a support 58 with inclined side walls 60 that extend upwardly from a central bottom wall in order to better contain the fluid F or the cuttings C on the conveyor 28, as the case may be. After the drill cuttings are offloaded from the drilling rig 12 and loaded into the bins 22, residual drilling fluid F is allowed to collect on the conveyor 28, as depicted on the left hand side of FIG. 10. During the loading process described above and during transport of the drill cuttings to shore, the conveyor 28 can be periodically operated to convey the collected drilling fluid F into a holding tank 64 (FIG. 12). The drilling fluid collected in the holding tank 64 can be pumped back onto the drilling rig 12 for re-use. Typically, the conveyor 28 is operated in a direction opposite to its normal operating direction when it is used to offload drill cuttings from the ship. Thus, the holding tank 64 typically is positioned at the end of the storage system 14 opposite the inclined conveyors 30, as depicted in FIG. 7.

When the ship 10 arrives at its intended docking location, the contents of the storage bins 22 can be transferred onto storage equipment on the shore. The gates 50 at the bottom of the bins can be opened in a predetermined sequence to maintain the balance of the ship as the drill cuttings are released from the bins and conveyed off of the ship. For example, the bins 22 typically are not emptied sequentially along the length of the ship. Instead, a pair of bins 22 on opposite sides of and equidistant from the center of gravity of the ship can be emptied one after on opposite sides of and equidistant from the center of gravity of the ship can be emptied one after the other or at the same time before another pair of bins that are equidistant from the ship's center of gravity are emptied (the bins of each pair are desirably in separate rows on opposite sides of the ship's longitudinal center line L but could be in the same row). As mentioned above, each bin 22 can be provided with multiple pairs of gates 50. Thus, the offloading procedure can include partially emptying bins in a predetermined sequence, which helps avoid overloading the conveyor 28. The operation of the gates 50 and the offloading conveyor 28 can be under the control of the controller 40.

The offloading system can be provided with sensors that detect for the presence of drill cuttings on the conveyor 28 and provide feedback to controller 40 for controlling the operation of the gates 50. In the illustrated embodiment, for example, a plurality of sensors 66 are placed along the length of each conveyor 28, such as at equally spaced locations adjacent one end of each bin 22, as shown in FIG. 7. The sensors 66 can be optical sensors that are configured to detect the presence of drill cuttings on the conveyors 28. The sensors 66 are in communication with the controller 40, which operates the gates 50 of the bins to ensure that the contents of each bin is dispensed onto an empty section of a conveyor 28 and is not dispensed on the contents of another bin already dispensed onto the conveyor 28.

In operation, drill cuttings are dispensed from a predetermined bin 22 onto a conveyor 28 and conveyed toward the inclined conveyors 30 (as indicated by the direction of arrow 68 of FIG. 7). As the drill cuttings on the conveyor 28 pass the sensors 66, each sensor 66 provides a corresponding feedback signal to the controller 40, telling the controller whether a section of the conveyor immediately upstream of the sensor is clear, or substantially clear of drill cuttings. In particular embodiments, the sensors 66 can comprise 3D sensors that are configured to determine an amount of drill cuttings on a section of the conveyor and/or to provide a visual image of the drill cuttings to the user. If the section of the conveyor 28 underneath the next bin in the sequence is clear, or substantially clear of drill cuttings, the controller 40 will control the gates 50 of that bin 22 to dispense drill cuttings onto the conveyor 28. In alternative embodiments, other techniques and mechanisms can be used to detect for the presence of drill cuttings on sections of a conveyor 28. For example, scales can be positioned at selected locations underneath a conveyor to measure the weight of any drill cuttings that are present along the length of the conveyor. Another mechanism can be used to determine the force required to move the conveyor, which provides an indication of the presence of drill cuttings on the conveyor. For example, transducers can be operatively connected to the hydraulic mechanisms that drive the conveyors 28. The transducers can detect the hydraulic pressure of the drive mechanisms and convert the pressure measurement into a signal indicative of the load present on the conveyors.

In the event that one or more bins 22 fail to dispense drill cuttings onto the conveyor 28 during offloading, the controller 40 can be configured to prevent the corresponding bin or bins on the opposite side of the ship's center of gravity and/or longitudinal center line from dispensing drill cuttings until manually overridden by an operator. The failure of a bin 22 to dispense drill cuttings can be due to, for example, failure of one or more gates 50 to open. The controller 40 can be configured to detect a failure of a bin 22 to dispense drill cuttings in a variety of ways, including receiving an indication from a gate 50 that the gate has failed to move from the closed position to the open position, receiving data from the sensors 66 indicating a lack of drill cuttings on the conveyor 28, receiving data from scales indicating a lack of drill cuttings on the conveyor 28, or receiving data from sensors in the bin(s) indicating no change in the amount of drill cuttings present in the bins after the controller 40 has transmitted instructions to open one or more gates 50. In this manner, the controller 40 can alter the predetermined sequence in which the drill cuttings are offloaded to maintain the balance of the ship in the event that one or more bins 22 fail to dispense drill cuttings onto the conveyor 28, regardless of whether an operator is aware of the failure. Similarly, if a bin 22 is only partially evacuated, such as because a gate does not fully open or material becomes clogged inside the bin, the controller can detect the amount of the drill cuttings dispensed from the bin, such as from feedback signals received from the sensors or scales, and control the bin on the opposite side of the ship's center of gravity (and desirably on the opposite side of the ship's longitudinal center line L) to dispense the same amount of drill cuttings onto the conveyor.

Still referring to FIG. 7, drill cuttings on the offloading conveyors 28 are conveyed onto respective inclined conveyors 30, which in turn convey drill cuttings onto the transverse conveyor 32. The transverse conveyor 32 can include a scale to measure the total weight of the drill cuttings being offloaded from the ship. Drill cuttings on the transverse conveyor are then conveyed onto the final offloading conveyor 34.

Figure 5:
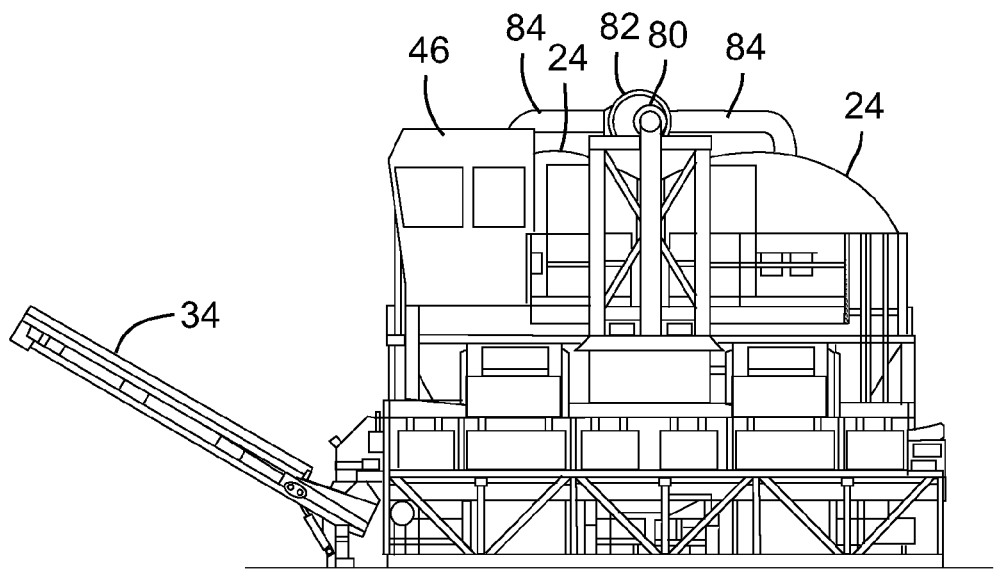
FIG. 5 is an end elevation view of the drill cutting storage and conveying system of FIG. 1.
Figure 6:
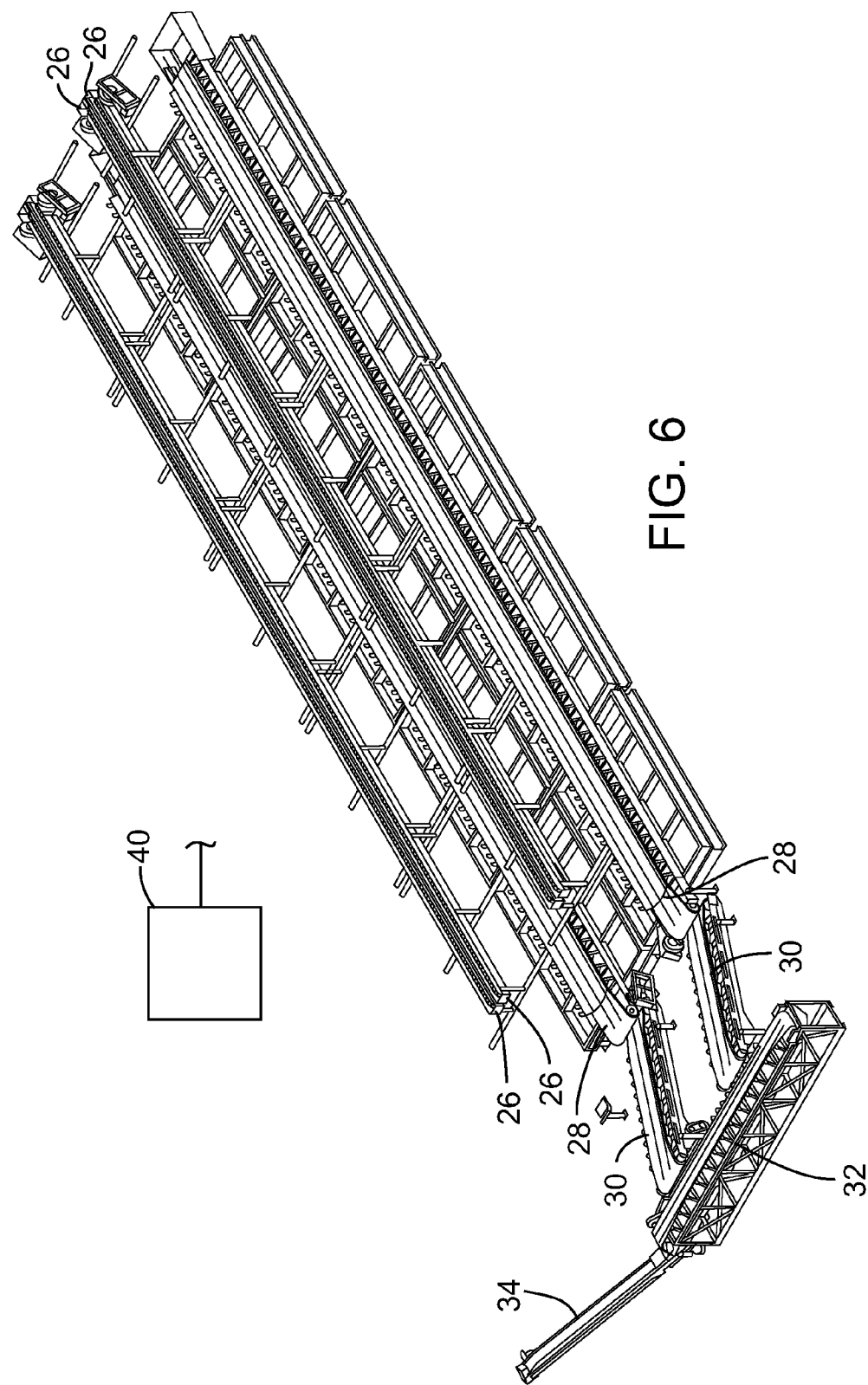
FIG. 6 is a perspective view of the drill cutting storage and conveying system of FIG. 1, shown with the storage bins and enclosures removed for purposes of illustration.
Figure 13:
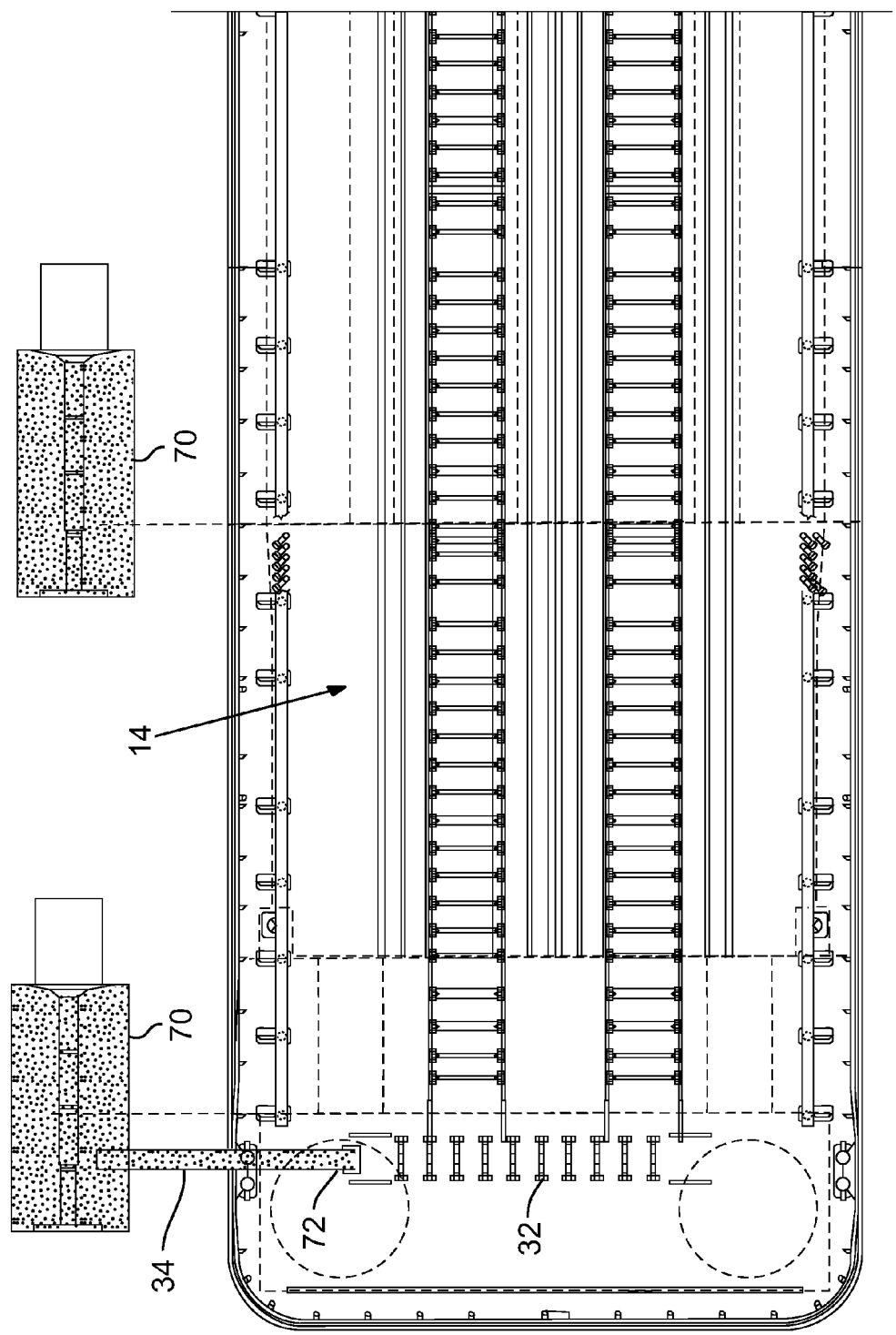
FIG. 13 is a top plan view showing one end of the ship and vehicles on a dock receiving drill cuttings from the drill cutting storage and conveying system on the ship.
Figure 14:
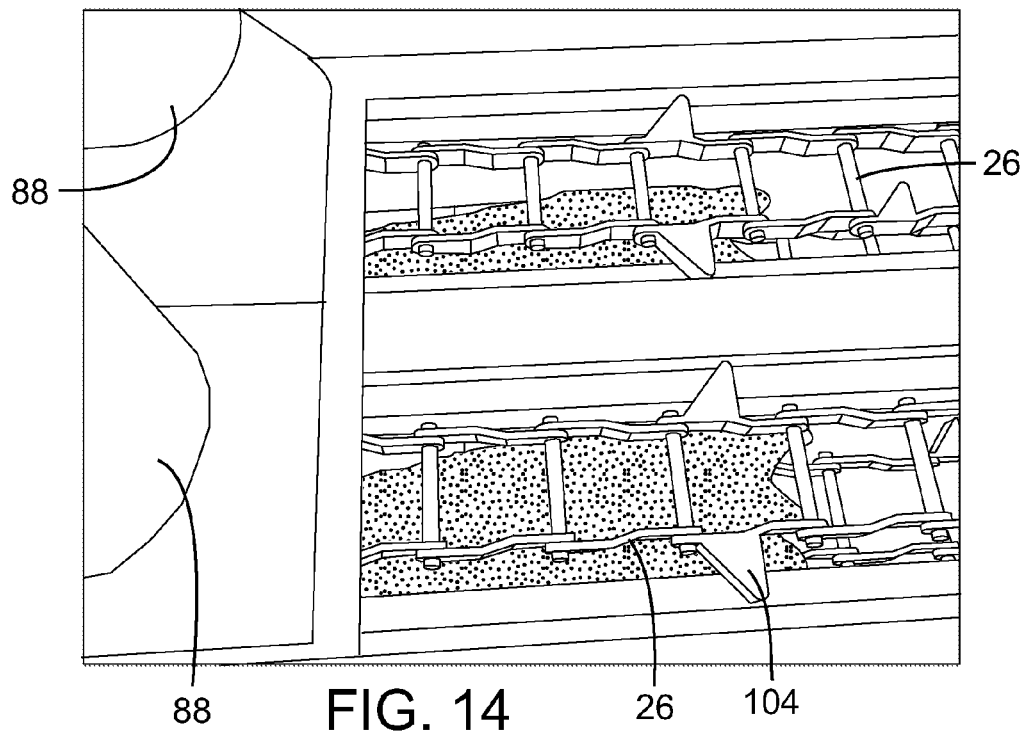
FIG. 14 is a perspective view of a section of a pair of drag chain conveyors being used to convey and dispense drill cuttings into storage bins.
Figure 15:
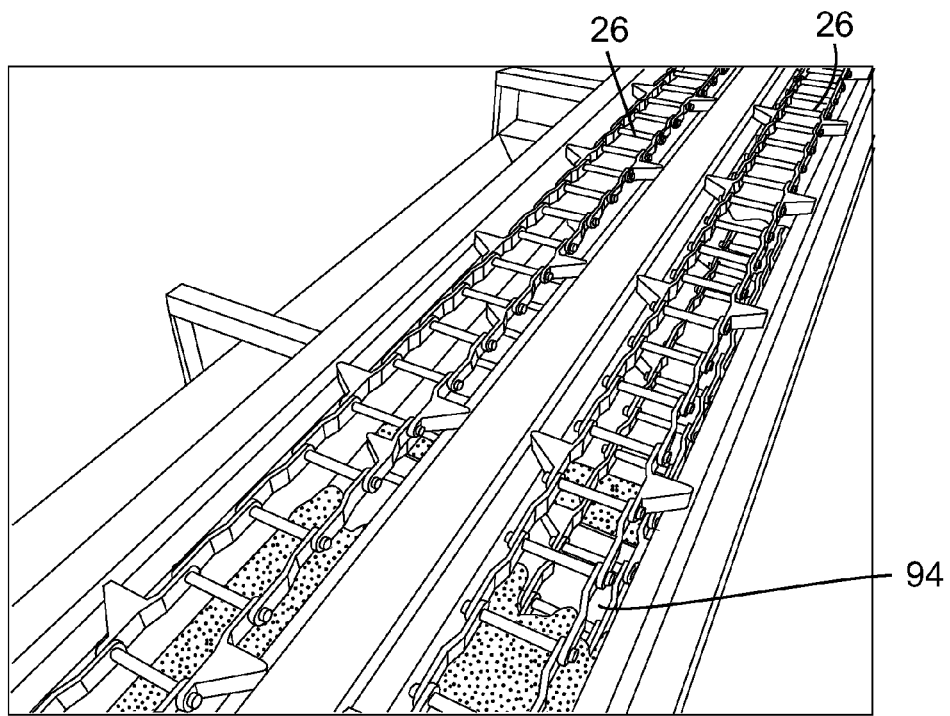
FIG. 15 is another perspective view of a section of the pair of drag chain conveyors.

Referring now to FIGS. 5 and 13, the offloading conveyor 34 can be positioned by an operator to convey drill cuttings into one or more vehicles 70 (e.g., trucks with storage bins) that are parked in the dock area adjacent the ship. The offloading conveyor 34 desirably is pivotable about its base 72 in a side-to-side direction as well as the up-and-down direction. Desirably, the offloading conveyor 34 is pivotable side-to-side at least through 180 degrees and is pivotable up and down at least through 90 degrees to facilitate positioning the upper, free end of the conveyor 34 above a waiting vehicle 70. A video camera can be mounted on the upper end of the conveyor 34 to assist the operator in positioning the upper end of the conveyor 34 at a desired location above the vehicle 70. Because the conveyor 34 has three degrees of movement and can be easily positioned by the operator, it is not necessary to have the vehicle precisely located at a predetermined location with respect to the conveyor.

After the present vehicle is filled to capacity with drill cuttings, that vehicle is driven away, the operator temporarily discontinues the offloading process, another vehicle is driven into the general vicinity of the conveyor 34, and the operator aligns the conveyor 34 above the empty vehicle and continues the offloading process. This process can be repeated with additional trucks until the entire contents of the bins 22 are offloaded from the ship. In this manner, drill cuttings can be offloaded from the ship 10 in less than a day, resulting in significant time and cost savings over conventional drill cutting transport and offloading techniques, which can take seven days or more to complete. Additionally, the scale on the offloading conveyor 34 can allow the operator and/or the controller 40 to precisely track the weight of drill cuttings offloaded onto each vehicle 70 to avoid overloading the vehicle.

In particular embodiments, the offloading conveyor 34 can be configured to dispense a predetermined amount of drill cuttings into each truck, such as based on the maximum load capacity of the truck. When the drill cuttings being offloaded exceed a predetermined weight as measured by the scale, the offloading conveyor 34 is then turned off.

The following examples are provided to illustrate certain features of working embodiments. A person of ordinary skill in the art will appreciate that the scope of the present invention is not limited to the scope of the features exemplified by these examples.

Example 1

Figure 18:
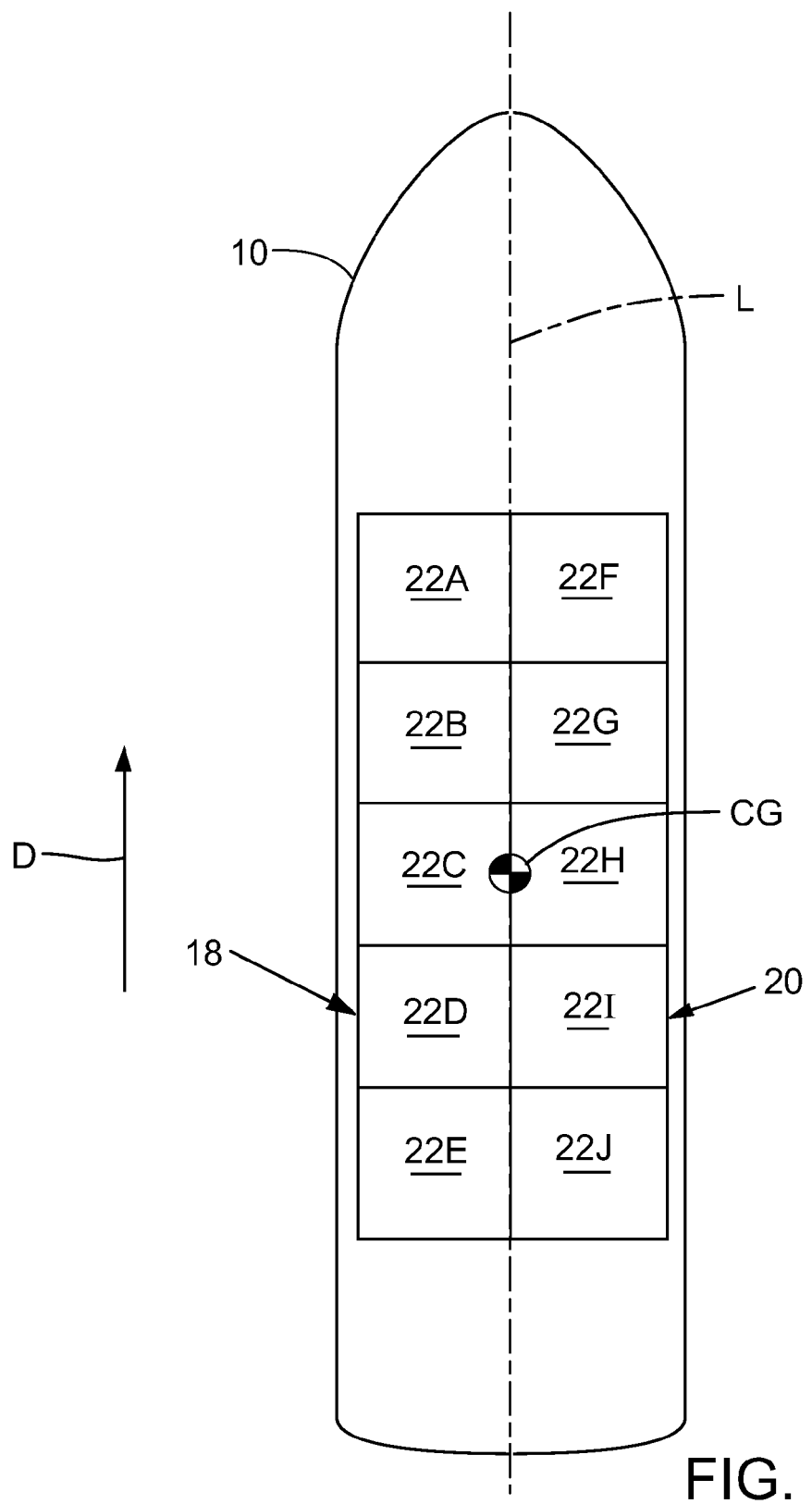
FIG. 18 is a schematic, top plan view of the system of FIG. 1 showing the location of the storage bins relative to the ship's center of gravity and longitudinal center line.

In a first example of operating the system, a ship 10 is provided having a center of gravity G, a longitudinal center line L, and the drill cuttings storage and conveyor system of FIG. 1, as shown schematically in FIG. 18. The storage and conveyor system includes a first row 18 of storage bins 22A-22E and a second row 20 of storage bins 22F-22J, the first and second rows 18, 20 being arrayed about the center of gravity CG and located on opposite sides of the ship's longitudinal center line L.

During a loading process, drill cuttings are transferred to the ship 10 from a drilling rig by a conduit 16, as depicted in FIG. 1. A metering device 82 (FIG. 1) onboard the ship 10 meters the drill cuttings onto loading conveyors positioned above the rows 18, 20 of storage bins. A controller 40 (FIG. 6) operates the loading conveyors and gates located along the length of the loading conveyors according to a predetermined sequence. The controller transmits control signals to the metering device causing the metering device to meter drill cuttings onto the loading conveyors of the first row 18 of storage bins, and transmits control signals to gates in the loading conveyors located above a bin at the end of the row 18, such as storage bin 22A, causing the gates to open. Drill cuttings are thereby dispensed from the loading conveyors through the gates and into storage bin 22A. When the level of drill cuttings in bin 22A reaches a predetermined height, the controller transmits control signals causing the gates above bin 22E to open and causing the gates above bin 22A to close. Drill cuttings are thereby dispensed from the loading conveyors into bin 22E.

When the level of drill cuttings in bin 22E reaches a predetermined height, the controller transmits control signals causing the gates above bin 22E to close and causing the gates above bin 22B to open. Drill cuttings are thereby dispensed from the loading conveyors into bin 22B. This procedure is repeated for dispensing drill cuttings into bins 22D and 22C.

When the bins 22A-22E of row 18 have been loaded with drill cuttings, the controller transmits control signals to the metering device causing the metering device to cease metering drill cuttings onto the loading conveyors of row 18 and to begin metering drill cuttings onto the loading conveyors of row 20. The controller also transmits control signals causing the loading conveyors of row 20 to enter an operational state, causing the gates above a bin at the end of the row 20, such as bin 22F, to open, and causing the loading conveyors of row 18 to shut down or enter an otherwise idle or non-operational state. Bins 22F-22J can then be loaded in the same sequence as described above with respect to bins 22A-22E. This process is repeated with each bin until the ship 10 is fully loaded or there are no more drill cuttings being transferred from the drilling rig. When the ship 10 reaches its destination, the bins 22A-22J can be unloaded in substantially the same order in which they were loaded. In another example, any one of bins 22E, 22F, or 22J can be loaded first, with the loading sequence proceeding in substantially the same pattern as described above. In another example, the system can be operated such that the ship 10 is loaded from the center outwardly toward the ends (e.g., bin 22C is loaded first, followed by, for example, bin 22B, bin 22D, etc.).

The loading sequence described above is most appropriate for a system having a single row of bins aligned along the longitudinal center line L of the ship. When more than one row of bins on opposite sides of the longitudinal center line L are present, the ship may become unbalanced with respect to the longitudinal center line L as material is added to the first row of bins. In such cases, the control can detect the tilt of the ship and begin dispensing drill cuttings in the second row of bins if the ship's tilt exceeds a predetermined amount.

Example 2

Referring again to FIG. 18, in a second example of operating the system, the metering device onboard the ship 10 meters drill cuttings from a drilling rig onto loading conveyors positioned above the rows 18, 20 of storage bins 22A-22E and 22F-22J, respectively. The controller operates the loading conveyors and gates located along the length of the loading conveyors according to a predetermined sequence. The controller transmits control signals to the metering device causing the metering device to meter drill cuttings onto the loading conveyors of the first row 18 of storage bins, and transmits control signals to gates in the loading conveyors located above, for example, storage bin 22A, causing the gates to open.

Drill cuttings are dispensed from the loading conveyors through the gates and into storage bin 22A. When the level of drill cuttings in bin 22A reaches a predetermined height, the controller transmits control signals causing the gates above bin 22E to open and causing the gates above bin 22A to close. Drill cuttings are thereby dispensed from the loading conveyors through the gates and into bin 22E.

When the level of drill cuttings in bin 22E reaches a predetermined height, the controller transmits control signals to the metering device causing the metering device to cease metering drill cuttings onto the loading conveyors of row 18 and to begin metering drill cuttings onto the loading conveyors of row 20. The controller also transmits control signals causing the loading conveyors of row 20 to enter an operational state, causing the gates above, for example, bin 22F to open, causing the gates above bin 22E to close, and causing the loading conveyors of row 18 to shut down or enter an otherwise idle or non-operational state.

The metering device continues to meter drill cuttings onto the loading conveyors of row 20, which continues to convey and dispense the drill cuttings into bin 22F until the level of drill cuttings in bin 22F reaches a predetermined height. The controller then transmits control signals causing the gates above bin 22J to open and causing the gates above bin 22F to close. Drill cuttings are thereby dispensed into bin 22J.

When the level of drill cuttings in bin 22J reaches a predetermined height, the controller transmits control signals to the metering device causing the metering device to cease metering drill cuttings onto the loading conveyors of row 20 and to begin metering drill cuttings onto the loading conveyors of row 18 again. This procedure is repeated for dispensing drill cuttings into bins 22B and 22D, and then bins 22G and 22I. In this manner, the bins are loaded in a sequence that balances the load with respect to the longitudinal center line L. Bins 22C and 22H are loaded last, and the process is repeated as necessary until the ship 10 is fully loaded or there are no more drill cuttings to be transferred from the drilling rig. When the ship 10 reaches its destination, the bins 22A-22J can be unloaded in substantially the same order in which they were loaded. In another example, any one of bins 22E, 22F, or 22J can be loaded first, with the loading sequence proceeding in substantially the same pattern as described above. In another example, the rows of bins are loaded from the center outwardly towards the ends, such that bins 22C and 22H are loaded first, followed by bins 22B and 22D, followed by bins 22G and 22I, and so on.

Example 3

Referring again to FIG. 18, in a third example of operating the system, the metering device onboard the ship 10 meters drill cuttings from a drilling rig onto loading conveyors positioned above the rows 18, 20 of storage bins 22A-22E and 22F-22J, respectively, at the same time. The controller operates the loading conveyors and gates located along the length of the loading conveyors according to a predetermined sequence. The controller transmits control signals to the metering device causing the metering device to meter drill cuttings onto the loading conveyors of the first row 18 and the second row 20 of storage bins.

The controller transmits control signals to gates in the loading conveyors of rows 18, 20 located above, for example, storage bins 22C and 22H, respectively, causing the gates to open. Drill cuttings are dispensed from the loading conveyors through the gates and into storage bins 22C and 22H. When the level of drill cuttings in bins 22C and 22H reaches a predetermined height, the controller transmits control signals causing the gates above bins 22D and 22I to open and causing the gates above bins 22C and 22H to close. Drill cuttings are thereby dispensed into bins 22D and 22I. When the level of drill cuttings in bins 22D and 22I reaches a predetermined height, the controller transmits control signals causing the gates located above bins 22B and 22G to open and causing the gates above bins 22D and 22I to close. Drill cuttings are thereby dispensed into bins 22B and 22G.

This procedure is repeated for dispensing drill cuttings into bins 22E and 22J, and bins 22A and 22F. The process is repeated as necessary until the ship 10 is fully loaded or there are no more drill cuttings to be transferred from the drilling rig. When the ship 10 reaches its destination, the bins 22A-22J can be unloaded in substantially the same order in which they were loaded. In another example, the system can be operated such that bins 22A and 22F or bins 22E and 22J are loaded first, followed by the respective pair of bins located equidistant from and on the opposite side of the center of gravity CG of the ship 10, and so on.

Example 4

Referring again to FIG. 18, in a fourth example of operating the system, drill cuttings are loaded into pairs of bins that are equidistant from the ship's center of gravity and on opposite sides of the ship's longitudinal center line L and the center of gravity. For example, drill cuttings can be dispensed first into bin 22A of the first row to a predetermined height, and then into bin 22J of the second row. The process is then carried out for bins 22E, 22F, bins 22B, 22I, bins 22D, 22G, and finally bins 22C, 22H. The entire process can be repeated as desired until the desired load is dispensed into each bin. In another example, the process can begin with bins 22C, 22H, followed by bins 22B, 22I, bins 22D, 22G, and so on. In yet another example, pairs of bins on opposite sides of the ship's center of gravity and the longitudinal center line L can be loaded simultaneously. For example, bins 22A and 22J can be loaded simultaneously to a predetermined height, followed by bins 22E and 22F, and so on. It can be appreciated that the exact loading procedure can be selected based on the degree of precision required to maintain the balance of the ship.

Example 5

Referring again to FIG. 18, in a fifth example of operating the system, the drilling rig contains a known quantity of drill cuttings comprising materials from different strata of a wellbore (e.g., clay, sand, rock, etc.) stored onboard the drilling rig. Using data regarding the type and quantity of drill cuttings, known quantities of drill cuttings can be loaded into the bins 22A-22J according to any of the sequences of Examples 1-4 above. The bins can be loaded such that pairs of bins in the same row and pairs of bins in different rows that are equidistant from the center of gravity CG can have similar layering of drill cuttings (i.e., pairs of bins equidistant from the center of gravity CG can have substantially equal amounts of drill cuttings of the same type of material). For example, pairs of bins equidistant from the center of gravity CG at or near the ends of a row can be filled with substantially equal amounts of clay, sand and/or rock, while bins closer to the center of gravity CG can be filled with substantially equal amounts of rock.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of loading drill cuttings onto a waterborne vessel, comprising:
   receiving drill cuttings from a drilling rig onto a conveyor system extending lengthwise of the waterborne vessel above a plurality of containers;
   determining information indicative of the presence of a first drill cuttings material type on the conveyor system;
   conveying the drill cuttings along the conveyor system; and
   dispensing the drill cuttings from the conveyor system into at least a first container of the plurality of containers based at least in part on the first drill cuttings material type such that the balance of the vessel is maintained during loading;
   determining information indicative of the presence of a second drill cuttings material type on the conveyor system; and
   dispensing the drill cuttings from the conveyor system into the first container based at least in part on the second drill cuttings material type such that the first container includes drill cuttings of the first and second drill cuttings material types.

2. The method of claim 1, wherein the act of dispensing comprises dispensing drill cuttings from the conveyor system into the plurality of containers in a predetermined sequence.

3. The method of claim 2, wherein the predetermined sequence further comprises dispensing drill cuttings from the conveyor system into the first container until the level of drill cuttings reaches a predetermined height, then dispensing drill cuttings into a second container that is equidistant from but on the opposite side of the vessel's center of gravity than the first container.

4. The method of claim 1, wherein the conveyor system comprises a first conveyor system and a second conveyor system, the first conveyor system being located above the plurality of containers and the second conveyor system being located below the plurality of containers.

5. The method of claim 4, further comprising unloading the vessel by dispensing the drill cuttings from the plurality of containers onto the second conveyor system in a predetermined sequence such that the balance of the vessel is maintained during unloading.

6. The method of claim 4, further comprising collecting drilling fluid from the drill cuttings in the first container onto the second conveyor system; and
   conveying the collected drilling fluid to a holding tank at one end of the second conveyor system.

7. The method of claim 1, wherein dispensing the drill cuttings further comprises dispensing the drill cuttings such that at least two containers of the plurality of containers include substantially equal amounts of drill cuttings of the first drill cuttings material type and substantially equal amounts of drill cuttings of the second drill cuttings material type.

8. The method of claim 1, wherein determining information further comprises receiving information from a drilling rig indicative of the first drill cuttings material type.

9. The method of claim 1, wherein determining information further comprises determining a weight of the drill cuttings on the conveyor system indicative of the first drill cuttings material type.

10. A controller operable to perform the method of claim 1.

* * * * *